ABSTRACT OF THE DISCLOSURE

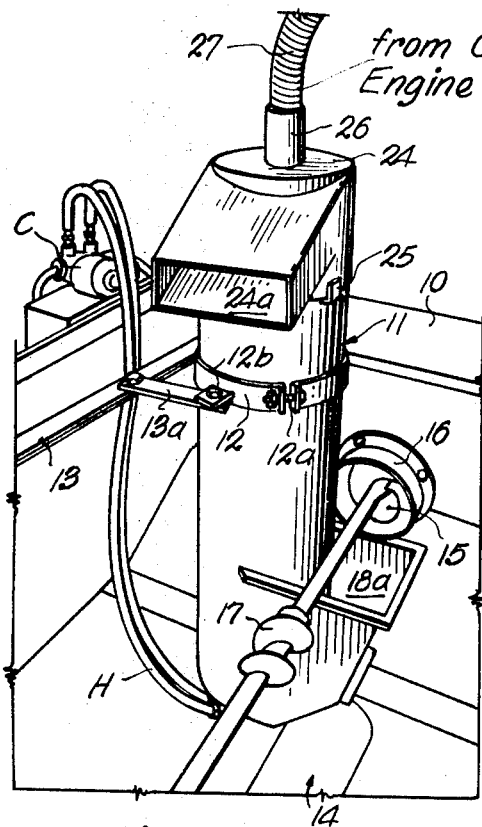
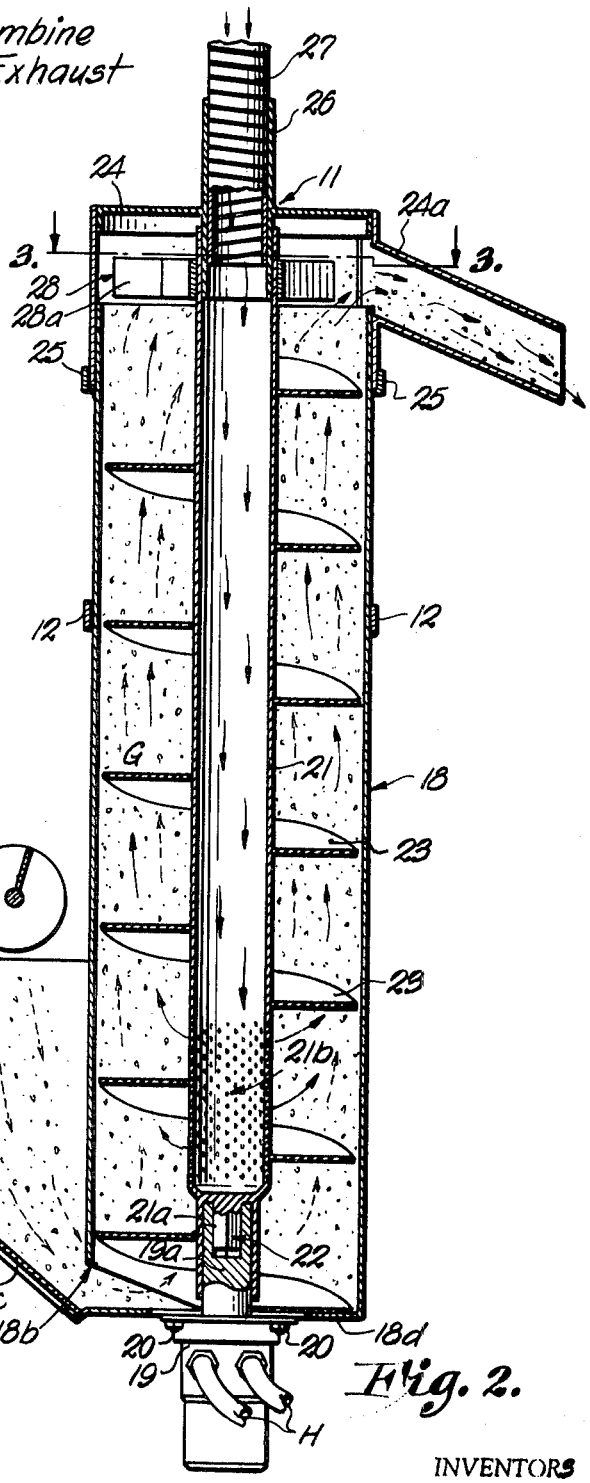
INVENTORS
Horace R. Ward
Kenneth A. Wirtz 3,581,407
GRAIN CONDITIONER
Horace R. Ward, R.R. 2, Windsor, Mo. 65360, and
Kenneth A. Wirtz, R.R. 1, Garden City, Mo. 64747
Filed Jan. 25, 1968, Ser. No. 707,348
Int. Cl. F26b 11/12
U.S. Cl. 34—182                                    6 Claims

An apparatus for conditioning grain while in the grain tank of a combine or similarly related grain harvesting equipment. The apparatus includes a main housing in the shape of a cylindrical chamber, same being mounted within the grain tank in an optical position to receive the grain therewithin as it is delievered into the tank. A centrally mounted auger with a tubular center shaft is axially located within the chamber. The shaft is coupled with the combine engine exhaust by a flexible hose in such a manner that the hot exhaust gases heat the auger as well as co-mingle with the grain within the chamber. A gravity discharge chute at the upper end portion of the chamber allows the upwardly conveyed and now conditioned grain to spill out and back into the tank.

BACKGROUND AND BRIEF DESCRIPTION OF THE INVENTION

Conventional combines, either self-propelled or otherwise, generally convey the harvested grain from a shaker-type "shoe" into a grain tank where it remains until the tank is either full, thereby necessitating unloading, or, unless it is unloaded from the grain tank, into an accompanying high-sided truck or wagon during cutting. In either case, the harvested grain is eventually unloaded from the tank and is then conditioned by heating to eliminate excess moisture and finally cooled before storage. O-ring gas burners in combination with heavy duty fans are among the most commonly used grain heating devices. To use same generally requires unloaling the grain into separate and independent grain conditioners. This, of course, is expensive and time consuming, both from the standpoint of the equipment required and the time and labor involved in doing so.

Our invention conditions the grain while in the grain tank of the combine during the cutting operation. Other attempts have been made in the area of conditioning grain within a combine or a threashing machine, and some of the better known devices utilize independent heating and blowing means in combination with suspension grates, heating and cooling platforms, and the like.

Our invention contemplates making use of both the heat and the exhaust gases from the combine engine in such a manner that separate heaters are no longer needed. We propose constructing a grain conditioner having a cylindrical chamber with a grain receiving chute located adjacent the intake conveyor within the grain tank. As the grain enters the grain tank from the shaker-type shoe, it is immediately delivered interiorly of the cylindrical chamber via the operatively associated grain chute. A centrally mounted conveyor means moves the grain upwardly from the lowermost portion of the cylindrical chamber to a second gravity discharge chute at the upper end thereof where the grain is allowed to spill back into the grain tank. The conveyor means (in the preferred embodiment it is shown as an auger having a tubular shaft) is connected with the combine engine exhaust in such a manner that the exhaust gases are co-mingled with the grain. The exhaust gases also heat the auger type conveyor so that a two-fold conditioning effect is had on the grain during its upward movement within the cylindrical chamber. It is well known that, as water is evaporated, a phenomena known as evaporative cooling takes place. In grain drying at high moisture contents, the grain kernel itself is not heated to any great extent as the grain is constantly on the move, and the hot air passes through the grain mass. In this manner, the grain conditioner acts hygroscopically to decrease the moisture content and wet surface film on the particulate grain material.

Accordingly, by the time the grain tank is filled to its maximum capacity or, if the grain is simultaneously unloaded during cutting, the grain has been conditioned in that detrimental moisture is removed. It is sometimes desirable to cool the conditioned grain prior to storage or sale.

One of the primary objects of the invention is to provide a uniquely constructed time and labor saving grain conditioning apparatus that conditions grain in the grain tank of a combine during the actual harvesting of same.

Another object of the invention is to provide an apparatus of the character described that eliminates the need for expensive heating and blowing equipment associated with conventional conditioning apparatus. It is an important feature of the invention that the exhaust gases from the combine engine both co-mingle with the grain in the apparatus and heat the apparatus. In this manner, the gases, which are coupled directly to the apparatus, are fully utilized and the need for costly additional equipment is negated.

A further object of the invention is to provide grain conditioning apparatus for operation in the grain tank of a combine that not only conditions the grain against excessive moisture but kills certain insects and other pests that cause and promote grain rot.

A still further object of the invention is to provide an apparatus whose unique construction allows it to act both as a grain conditioner on a combine and at the same time as the muffler for the combine engine. The unique construction is further exemplified by the orientation of same within the grain tank of the combine and the cooperation with conventional hydraulic motor so as to eliminate the need for bearings in conjunction with many of the moving parts therein. Alternately, other types of motors may be utilized with the subject invention.

DETAILED DESCRIPTION OF THE INVENTION

In the accompanying drawing, which forms a part of the specification and is to be read in conjunction therewith, like reference numerals indicate like parts in the various views.

FIG. 1 is a perspective view of the subject grain conditioner, same shown as being mounted within the grain tank of a combine;

FIG. 2 is a sectional view taken generally along the longitudinal center line of the grain conditioner with the upper cap and gravity discharge chute rotated 90° relative to the inlet when compared to the corresponding parts in FIG. 1 for purposes of clarity; and FIG. 3 is a sectional view taken generally along the line 3—3 of FIG. 2 in the direction of the arrows.

Turning now more particularly to the drawing, reference numeral 10 (FIG. 1) represents a typical grain tank which is centrally mounted on the frame of a self-propelled combine such as any one of the Allis-Chalmers models which are identified by the trademark "Gleaner." The grain tank is constructed of a heavy gauge steel, which is galvanized on both sides and fixedly connected to the above-mentioned frame in a conventional manner. The grain conditioning apparatus, generally indicated by the numeral 11, is mounted slightly off center within grain tank 10 by interconnecting the apparatus supporting collar 12 with a tank spanning supporting structural 13.

Collar 12 has two semi-circular in shape sections which are bolted together at 12a (one bolt shown in FIG. 1). A plurality of bracket-like projections 12b extend radially outwardly from collar 12 and serve as supporting and connecting brackets for the shorter interconnecting structurals 13a. Accordingly, collar 12, in conjunction with structurals 13 and 13a, hold the conditioning device in an upright vertical position.

The construction and arrangement of the grain tank is generally similar to all known and existing prior art tanks. The tank is generally rectangular in shape at its upper open end portion with the lower portion of the tank converging in a V or trough-like manner thereby centrally locating the particulate grain for discharge conveyor 14. After the grain is separated from the straw, a conventional conveying means (not shown) transfers the relatively clean grain from a shaker-type shoe up into the grain intake conveyor and into the grain tank. The delivery of the grain into the tank is accomplished by means of a conventional screw-type auger 15. A flanged type auger housing 16 cooperates with auger 15 to direct the grain flow as it is brought into the tank. Flighting 17 (rotating in the same shaft as auger 15) serves to stir or otherwise circulate a full tank of grain.

Turning now more particularly to construction of the grain conditioner apparatus itself, apparatus 11 includes a cylindrical outer chamber 18. The lower end portion of the cylindrical chamber 18 has a grain receiving chute 18a extending outwardly therefrom so as to channel and direct the normal gravity flow of the grain interiorly of chamber 18. As best seen in FIG. 2, the lowermost left hand portion of chamber 18 is cut off to form an opening 18b between chute 18a and the interior of chamber 18. Chute 18a includes a sliding access door 18c at the lower end thereof which may be pulled out to open and to discharge the contents within the chute. If it is desired to unload the grain tank via conveyor 14 simultaneously with the combining and harvesting operation, then door 18c is usually completely removed thereby allowing all the grain to pass through virtually unrestricted.

The lower end extremity 18d of cylindrical member 18 is formed integrally with the side walls of the chamber, thereby substantially enclosing same save for the chute 18a and opening 18b. The central portion of the end 18d is suitably apertured to permit the mounting of a conventional hydraulic motor 19 so that the motor shaft 19a may extend axially and interiorly of chamber 18. Bolts 20 fixedly secure the motor 19 to the boot or end portion 18d of cylinder 18. Conventional hydraulic hoses H interconnect motor 19 with the operative controls C, which may be mounted on the side of tank 10.

A tubular shaft 21 is interconnected with the upwardly extending power shaft 19a of motor 19 by the splined or keyed connection generally represented by the numeral 22. The non-circular lower end 21a of shaft 21 fits within a similarly shaped slot in the upper end of power shaft 19a, thereby eliminating any need for additional bearings other than those generally associated with hydraulic motors. Auger flighting 23 is secured along substantially the entire length of tubular shaft 21 and is pitched so that grain falling into chamber 18 via chute 18a and through opening 18b will be conveyed upwardly as shaft 21 rotates. It is noted that the lowermost flighting portion is spaced sufficiently close to the boot end 18d in order to properly convey substantially all of the grain coming into cylindrical chamber 18. The lower portion of tubular shaft 21, immediately above the splined connection 22, with shaft 19a, is perforated or apertured (generally shown by numeral 21b) around the circumferential periphery to provide a plurality of suitable gas ports for the purpose of circulating exhaust gases within chamber 18, as will be discussed later.

The upper end of tubular shaft 21 extends above the upper end extremity of cylindrical chamber 18. A removable cap 24, having a discharge spout or chute 24a, is designed to be removably placed on the upper end portion of chamber 18 in a telescoping manner. A plurality of upwardly turned receiving brackets 25 are weldedly connected to the sides of chamber 18 and support cap 24 in a proper spaced relationship relative to the upper end of shaft 21. In addition to the spout or chute 24a, cap 24 includes a centrally apertured portion with a pipe length 26 weldedly connected at its midsection to the cap. In this manner, the pipe length extends both exteriorly and interiorly approximately equal distances relative to the outer surface of the cap. The interiorly extending portion of pipe length 26 is of a selected diameter so that it may be received within the upper end portion of tubular shaft 21. It should be noted that the tolerances of this fit are sufficient to allow freedom of rotative movement of the shaft by its associated hydraulic motor 19. A flexible hose 27 (coming from the combine engine exhaust) is inserted within pipe length 26 and extends interiorly of a cylindrical cap 24 and below the upper end extremity of shaft 21. The relative dimensions of hose 27 and pipe length 26 result in a sufficiently snug mating connection to preclude inadvertent disengagement, but nevertheless attachment and removal of hose 27 is easily accomplished by manual manipulation of the hose without the use of special tools, etc.

A grain discharge wheel 28 is comprised of three lengths of substantially flat, rectangular metal bars, which are welded in a star pattern (see FIG. 3) to the exterior surface of the upper end portion of tubular shaft 21. Actually, the flat metal bars form a central triangular-like configuration, when viewed from above, with each side of the triangle extended so as to form a grain pushing surface (identified by numerals 28a). When shaft 21 rotates, the discharge wheel also rotates and the extended surfaces help move the grain into gravity discharge chute 24a.

OPERATION

As stated above, the subject grain conditioning device is mounted within the grain tank of a self-propelled combine or other type harvesting equipment having a grain tank therein. The exhaust gases from the combine or prime mover engine are coupled directly to the grain conditioning apparatus via flexible hose 27. As the combine proceeds with its grain harvesting operation, the particulate grain (identified by the letter G and whose flow direction is shown by the broken arrows in FIG. 2) is delivered to the grain tank by auger 15 through the opening circumscribed by the flanged cover 16. The grain immediately spills into the intake chute 18a and eventually through the communicating opening 18b within the chamber 18 (assuming the sliding door 18c is in its closed position as shown in FIG. 2). The hydraulic motor 19 has been turned on so that its power shaft 19a is imparting a rotative motion to tubular shaft 21 thereby moving flighting 23 in a direction to convey the particulate harvested grain G upwardly within chamber 18. Simultaneously, the exhaust gases (shown as solid arrows in FIG. 2) from the combine engine are transmitted through flexible hose 27, the pipe length 26, and interiorly of the tubular shaft 21.

The hot exhaust gases have a two-fold effect in that they both heat the tubular shaft and emanate through gas ports 21b at the lower end portion of the tubular shaft. The circulating gases are eventually transmitted or conveyed upwardly with the movement of the grain. This structural arrangement thereby subjects the grain G both to the heat of the shaft 21 (and auger flighting) as well as the gases themselves. Actually the jetting of the exhaust gases through the gas port 21b sometimes produces an "after burn" effect at the lower end of shaft 21. The hot gases and the hot contacting metal surfaces hygroscopically lessen the moisture of grain G and lessen the effects which could otherwise be injurious to the grain crop when stored or which tend to decrease its value when sold directly to an elevator or granary. Since the grain within chamber 18 is constantly moving and since evaporative cooling takes place as the grain is heated, the conditioned grain is not scorched or harmed in any way.

When the grain reaches the upper portion of chamber 18 as it is conveyed therewithin, the discharge wheel 28 with its grain contacting surface 28a will rotatively contact grain G and force same into a gravity discharge chute 24a. This chute directs the grain G away from intake chute 18a, thereby assuring that only grain having not been previously conditioned is delivered to the conditioning apparatus. As a result, when the grain tank is sufficiently full to warrant the emptying of same, the heating equipment that is normally required for grain conditioning has been successfully eliminated. There may be a need to cool the grain prior to storage, but this may be done by conventional aerating means and the need for additional burner equipment may often be eliminated.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described our invention, we claim:

1. An apparatus for conditioning grain in the grain tank of a grain harvesting device, said apparatus comprising:

a chamber, an inlet to said chamber at one end thereof, an outlet from said chamber at the other end thereof, said inlet operable to receive grain introduced thereto, said chamber being cylindrical in shape and including a tubular shaft axially mounted for rotation therein, means for vertically mounting said chamber in the grain tank of said device, said shaft having auger flighting disposed along substantially the length thereof and pitched to convey grain from said inlet upwardly to said outlet, means for rotating said shaft, one end of said shaft being interconnected to an engine exhaust of an engine associated with the normal operation of said harvesting device thereby directing said exhaust gases to flow interiorly of said shaft, a portion of the lower half only of said shaft being perforated, the upper half of said tubular shaft and a portion of said lower half of said tubular shaft being operable to direct said exhaust gases to said perforations, said perforations thereby providing a plurality of gas ports for the circulation of said exhaust gases within said chamber, said exhaust gases being operable to heat at least a portion of said tubular shaft and flighting and to co-mingle with the grain as same is being conveyed within said chamber, said co-mingling of grain and gases and said grain contacting said heated tubular shaft and flighting thereby conditioning said grain.

2. An apparatus for conditioning grain in the grain tank of a grain harvesting device, said apparatus comprising:

a chamber, an inlet to said chamber at one end thereof, an outlet from said chamber at the other end thereof, said inlet operable to receive grain introduced thereto, said chamber being cylindrical in shape and including a tubular shaft axially mounted for rotation therein, means for vertically mounting said chamber in the grain tank of said device, said shaft having auger flighting disposed along substantially the length thereof and pitched to convey grain from said inlet upwardly to said outlet, means for rotating said shaft, one end of said shaft being interconnected to an engine exhaust of an engine associated with the normal operation of said harvesting device thereby directing said exhaust gases to flow interiorly of said shaft, said exhaust gases being operable to heat at least a portion of said tubular shaft and flighting and to co-mingle with the grain as same is being conveyed within said chamber, said co-mingling of grain and gases and said grain contacting said heated tubular shaft and flighting thereby conditioning said grain, said shaft having a means for pushing the grain out of the upper end of said chamber as said shaft rotates.

3. An apparatus for conditioning grain in the grain tank of a grain harvesting device, said apparatus comprising:

a chamber, an inlet to said chamber at one end thereof, an outlet from said chamber at the other end thereof, said inlet operable to receive grain introduced thereto, said chamber being cylindrical in shape and including a tubular shaft axially mounted for rotation therein, means for vertically mounting said chamber in the grain tank of said device, said shaft having auger flighting disposed along substantially the length thereof and pitched to convey grain from said inlet upwardly to said outlet, means for rotating said shaft, one end of said shaft being interconnected to an engine exhaust of an engine associated with the normal operation of said harvesting device thereby directing said exhaust gases to flow interiorly of said shaft, said exhaust gases being operable to heat at least a portion of said tubular shaft and flighting and to co-mingle with the grain as same is being conveyed within said chamber, said co-mingling of grain and gases and said grain contacting said heated tubular shaft and flighting thereby conditioning said grain, said cylindrical chamber being vertically mounted within the grain tank of a grain harvesting combine, said chamber having an intake chute integrally formed at the lower end thereof and in communicating relationship with grain which has been harvested by said grain harvesting combine and delivered into said grain tank, a gravity discharge chute located at the upper end of said chamber and in communicating relationship with said outlet so that said grain is allowed to spill out of said chamber through said discharge chute and back into said grain tank.

4. The invention as in claim 3, wherein said gravity discharge chute is angularly positioned at least 90° away from said intake chute so that the grain falling from said discharge chute will not enter said intake chute.

5. The invention as in claim 3 wherein said exhaust gas interconnecting means includes a flexible hose that interconnects said tubular shaft with the exhaust of said combine engine, said flexible hose being slidably engaged within said tubular shaft.

6. The invention as in claim 3, wherein said intake chute includes a means for diverting the flow of grain away from the interior of said chamber, thereby precluding the conditioning of said grain.

References Cited

UNITED STATES PATENTS

| | | | |
|---|---|---|---|
| 430,652 | 6/1890 | Jarrett | 34—183X |
| 1,658,775 | 2/1928 | Campbell | 34—182UX |
| 2,706,371 | 4/1955 | Bishop | 56—20 |
| 3,330,050 | 7/1967 | Aushermann | 34—182X |

FOREIGN PATENTS

| | | | |
|---|---|---|---|
| 15,559 | 1892 | Great Britain | 34—166 |
| 11,946 | 1893 | Great Britain | 34—102 |

FREDERICK L. MATTESON, JR., Primary Examiner

H. B. RAMEY, Assistant Examiner

U.S. Cl. X.R.

34—166; 56—20, 21, 43.5